(12) United States Patent  
Hong

(10) Patent No.: US 9,708,222 B2  
(45) Date of Patent: Jul. 18, 2017

(54) LOW-TEMPERATURE SINTERING DIELECTRIC COMPOSITION AND MULTILAYER CERAMIC CAPACITOR FORMED THEREOF

(71) Applicant: SAMSUNG ELECTRO-MECHANICS CO., LTD., Suwon-Si, Gyeonggi-Do (KR)

(72) Inventor: Min Hee Hong, Suwon-Si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 14/949,408

(22) Filed: Nov. 23, 2015

(65) Prior Publication Data

US 2016/0168036 A1  Jun. 16, 2016

(30) Foreign Application Priority Data

Dec. 16, 2014  (KR) .................. 10-2014-0181526

(51) Int. Cl.
  *C04B 35/468*  (2006.01)
  *H01G 4/30*  (2006.01)
  (Continued)

(52) U.S. Cl.
  CPC .......... *C04B 35/4682* (2013.01); *B32B 18/00* (2013.01); *C03C 3/089* (2013.01); *C04B 35/638* (2013.01); *C04B 37/001* (2013.01); *H01G 4/0085* (2013.01); *H01G 4/1227* (2013.01); *H01G 4/248* (2013.01); *H01G 4/30* (2013.01);
  (Continued)

(58) Field of Classification Search
  CPC .................................................. C04B 35/4682
  See application file for complete search history.

(56) References Cited

U.S. PATENT DOCUMENTS

| 5,310,710 A * | 5/1994 | Takase ............... C04B 35/4686 501/137 |
| 5,650,368 A * | 7/1997 | Tateishi ............. C04B 35/4682 501/139 |
| 7,482,299 B2 * | 1/2009 | Masumura ......... C04B 35/4682 361/321.4 |
| 7,567,428 B2 * | 7/2009 | Sohn .................... C04B 35/468 361/301.4 |

(Continued)

FOREIGN PATENT DOCUMENTS

JP  2000-058378 A  2/2000
KR  10-2006-0135304 A  12/2006

(Continued)

OTHER PUBLICATIONS

Machine translation of KR 10-2006-0135304, Dec. 2006.*

*Primary Examiner* — Karl Group
(74) *Attorney, Agent, or Firm* — McDermott Will & Emery LLP

(57) ABSTRACT

A low-temperature sintering dielectric composition contains barium titanate ($BaTiO_3$) as a main ingredient and accessory ingredients including 1.0 to 2.0 mol % of barium carbonate ($BaCO_3$), 0.5 to 1.0 mol % of at least one rare earth oxide selected from the group consisting of $Y_2O_3$, $Ho_2O_3$, $Dy_2O_3$, and $Yb_2O_3$, 0.1 to 1.0 mol % of manganese oxide (MnO), and 1.0 to 2.0 mol % of borosilicate based glass, based on 100 mol % of the main ingredient.

5 Claims, 4 Drawing Sheets

(51) Int. Cl.
  *H01G 4/248*  (2006.01)
  *H01G 4/12*   (2006.01)
  *H01G 4/008*  (2006.01)
  *B32B 18/00*  (2006.01)
  *C03C 3/089*  (2006.01)
  *C04B 35/638* (2006.01)
  *C04B 37/00*  (2006.01)

(52) U.S. Cl.
  CPC ......... *C04B 2235/3201* (2013.01); *C04B 2235/3203* (2013.01); *C04B 2235/3208* (2013.01); *C04B 2235/3215* (2013.01); *C04B 2235/3224* (2013.01); *C04B 2235/3225* (2013.01); *C04B 2235/3236* (2013.01); *C04B 2235/3262* (2013.01); *C04B 2235/365* (2013.01); *C04B 2235/5445* (2013.01); *C04B 2235/5454* (2013.01); *C04B 2235/656* (2013.01); *C04B 2235/6584* (2013.01); *C04B 2235/785* (2013.01); *C04B 2237/346* (2013.01); *C04B 2237/588* (2013.01); *C04B 2237/704* (2013.01)

(56) References Cited

U.S. PATENT DOCUMENTS

| | | | | |
|---|---|---|---|---|
| 7,605,104 | B2* | 10/2009 | Sohn | C03C 3/089 361/321.4 |
| 7,691,762 | B2* | 4/2010 | Sohn | C03C 3/089 501/139 |
| 7,767,608 | B2* | 8/2010 | Nishigaki | B82Y 30/00 501/135 |
| 8,014,126 | B2* | 9/2011 | Sato | B82Y 30/00 361/306.1 |
| 8,270,144 | B2* | 9/2012 | Sohn | C03C 3/095 361/313 |
| 8,618,005 | B2* | 12/2013 | An | C03C 1/006 501/12 |
| 2009/0128988 | A1 | 5/2009 | Sohn et al. | |
| 2010/0165542 | A1* | 7/2010 | Sohn | C03C 3/095 361/313 |

FOREIGN PATENT DOCUMENTS

KR  10-0790682 B1  1/2008
KR  10-2009-0050665 A  5/2009

* cited by examiner

LOW-TEMPERATURE SINTERING DIELECTRIC COMPOSITION AND MULTILAYER CERAMIC CAPACITOR FORMED THEREOF

CROSS-REFERENCE TO RELATED APPLICATION

This application claims benefit of priority to Korean Patent Application No. 10-2014-0181526 filed on Dec. 16, 2014, with the Korean Intellectual Property Office, the disclosure of which is incorporated herein by reference.

TECHNICAL FIELD

The present disclosure relates to a low-temperature sintering dielectric composition and a multilayer ceramic capacitor formed thereof. More particularly, the present disclosure relates to a low-temperature sintering dielectric composition capable of implementing X7R temperature characteristics and a multilayer ceramic capacitor formed thereof.

BACKGROUND

Development of X5R or X7R type multilayer ceramic capacitors capable of securing stable electrical properties and reliability for stable operations of devices has become a necessity in the market of electronic devices, and slimness and high voltage capacity have been simultaneously considered as important factors in developing the corresponding multilayer ceramic capacitors.

The slimness and high voltage capacity increase an intensity of an electrical field applied to a dielectric body, which deteriorates DC-bias characteristics and withstand voltage characteristics, and a defect in a fine structure has a significantly greater influence on the withstand voltage characteristics such as break down voltage (BDV) and high-temperature characteristics (high-temperature insulation resistance (IR)). In order to solve the problem as described above, it is essential to atomize a base material. However, in a case in which the base material is atomized, since it may be difficult to implement capacitance and temperature characteristics of a product, it may be difficult to develop a dielectric composition.

In order to solve this problem, when a product is developed, it is important to comprehensively improve and develop an entire process of development of a dielectric base material powder and an additive composition, disposition, internal electrodes, and thermal treatment. Among the aforementioned, it is significantly important to develop the additive composition playing a critical role in characteristics of a multilayer ceramic capacitor.

As a dielectric material for a multilayer ceramic capacitor, barium titanate ($BaTiO_3$) has been mainly used, and in order to improve dielectric characteristics and reliability, various additive powders may be mixed with or added to this base material powder.

As the related art, a dielectric composition containing $\{Ba_{1-x}Ca_xO\}_m TiO_3$ as a main ingredient has been disclosed in JP 2000-058378. According to the related art, the dielectric composition disclosed is a dielectric composition in which calcium (Ca) should be used in the main ingredient. However, in a case of using the corresponding dielectric additive composition, dielectric characteristics and reliability may be secured, but thermal treatment at a high temperature of 1200° C. or more should be performed.

SUMMARY

An aspect of the present disclosure may provide a low-temperature sintering dielectric composition capable of implementing X7R temperature characteristics without containing Ca in a main ingredient, and a multilayer ceramic capacitor formed thereof.

According to an aspect of the present disclosure, a low-temperature sintering dielectric composition may contain barium titanate ($BaTiO_3$) as a main ingredient and accessory ingredients including 1.0 to 2.0 mol % of barium carbonate ($BaCO_3$), 0.5 to 1.0 mol % of at least one rare earth oxide selected from the group consisting of $Y_2O_3$, $Ho_2O_3$, $Dy_2O_3$, and $Yb_2O_3$, 0.1 to 1.0 mol % of manganese oxide (MnO), and 1.0 to 2.0 mol % of borosilicate based glass based on 100 mol % of the main ingredient.

As an example, an amount of the borosilicate based glass is a half to twice as much as an amount of barium carbonate ($BaCO_3$).

An average particle size of barium titanate ($BaTiO_3$) may be 100 nm to 200 nm.

The borosilicate based glass may contain boron oxide ($B_2O_3$) and silicon dioxide ($SiO_2$) as basic ingredients, and may further contain alkali-borosilicate based glass containing an alkali metal oxide, and at least one of an alkaline earth metal oxide and an alkaline earth metal fluoride.

The dielectric composition may be sintered at a low temperature of 1000° C. to 1100° C.

According to another aspect of the present disclosure, a multilayer ceramic capacitor may include a dielectric body including cover parts and a plurality of active layers, a plurality of internal electrodes formed in the dielectric body such that each of the active layers is interposed between adjacent internal electrodes, and external electrodes electrically connected to the internal electrodes. The dielectric body may be formed of the low-temperature sintering dielectric composition as described above.

An average particle size of a dielectric composition forming the active layer may be 150 nm to 300 nm, and an average particle size of a dielectric composition forming the cover part may be larger than an average particle size of the dielectric composition forming the active layer. The average particle size of the dielectric composition forming the cover part may be 300 nm to 400 nm.

The internal electrodes may be formed of a nickel (Ni) material.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
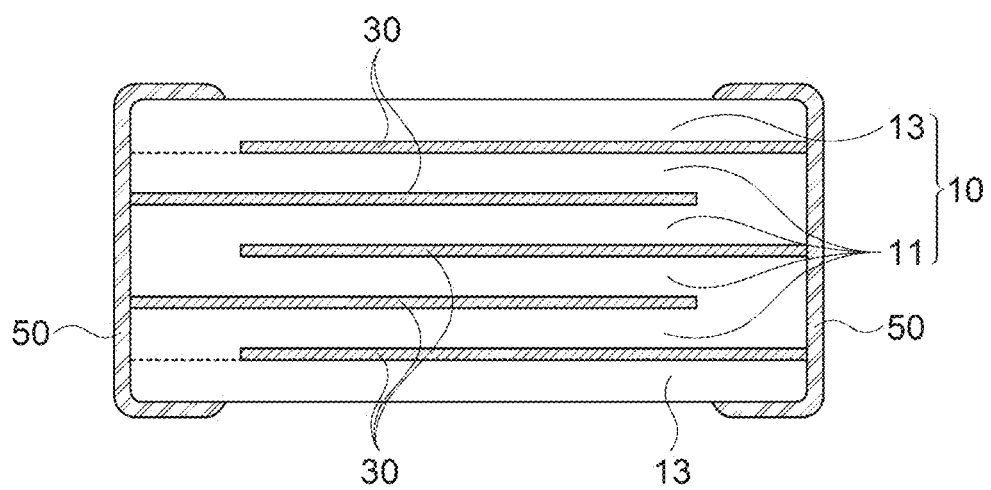
FIG. 1 is a cross-sectional view schematically showing a multilayer ceramic capacitor according to an exemplary embodiment in the present disclosure.

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

A low-temperature sintering dielectric composition according to an exemplary embodiment will be described in detail.

The low-temperature sintering dielectric composition according to the exemplary embodiment may contain barium titanate ($BaTiO_3$) as a main ingredient. Since barium titanate ($BaTiO_3$) has high permittivity, barium titanate may be used as a dielectric material of a multilayer ceramic capacitor requiring ultra-high permittivity. According to an exemplary embodiment, barium titanate ($BaTiO_3$) may have an average particle size of 100 nm to 200 nm. For example, a low-temperature sintering dielectric composition in which an average particle size of barium titanate ($BaTiO_3$) before sintering is 100 nm to 200 nm may form active layers 11 in a dielectric body 10 of a multilayer ceramic capacitor as shown in FIG. 1. The active layers 11 may be defined as dielectric layers interposed between internal electrodes. Conversely, dielectric layers covering outer portions of outermost internal electrodes may be referred to as cover parts 13 as shown in FIG. 1. For example, in a case in which the low-temperature sintering dielectric composition forms the cover parts 13 of the dielectric body 10 of the multilayer ceramic capacitor, the average particle size of barium titanate ($BaTiO_3$) before sintering may be out of a range of 100 nm to 200 nm.

In a case in which an average particle size of dielectric particles is excessively small (<100 nm), it may be difficult to implement capacitance, and in a case in which the average particle size thereof is excessively large (>200 nm), it may be easy to implement capacitance, but a sintering temperature may be increased, and high-temperature insulation resistance may be deteriorated. Further, in a range in which the average particle size is larger than 200 nm, since an average specific surface area of the particle is increased, an effect of content ranges of the accessory ingredients suggested in the present disclosure may not be exhibited. Therefore, in a case of forming, for example, the active layer 11 of the multilayer ceramic capacitor using the low-temperature sintering composition, the average particle size of barium titanate ($BaTiO_3$) before sintering may be 100 nm to 200 nm. For example, when barium titanate ($BaTiO_3$), the main ingredient, and the accessory ingredients are mixed with each other and sintered, an average particle size of the dielectric composition after sintering may be increased in comparison to that of the dielectric composition before sintering.

The accessory ingredients except for the main ingredient may include barium carbonate ($BaCO_3$), a rare earth oxide, manganese oxide (MnO), and borosilicate based glass.

In this case, a content of barium carbonate ($BaCO_3$) may be 1.0 to 2.0 mol %, a content of the rare earth oxide may be 0.5 to 1.0 mol %, a content of manganese oxide (MnO) may be 0.1 to 1.0 mol %, and a content of the borosilicate based glass may be 1.0 to 2.0 mol % based on 100 mol % of the main ingredient. Hereinafter, it should be noted that, unless otherwise defined herein, the contents of the accessory ingredients will be indicated based on 100 mol % of the main ingredient.

The rare earth oxide may be at least one selected from the group consisting of $Y_2O_3$, $Ho_2O_3$, $Dy_2O_3$, and $Yb_2O_3$. Here, the rare earth oxide may be an ingredient contributing to forming a core-shell structure of barium titanate ($BaTiO_3$), the main ingredient, and improving high-temperature insulation resistance and an average lifetime of the multilayer ceramic capacitor. The content of the rare earth oxide may be 0.5 to 1.0 mol % based on 100 mol % of the main ingredient. In a case in which the content of the rare earth oxide is less than 0.5 mol %, high-temperature insulation resistance may be decreased or an average lifetime of the multilayer ceramic capacitor at a high temperature (100° C. to 150° C.) may be decreased. Conversely, in a case in which an added amount of the rare earth oxide is more than 1.0 mol %, a shell thickness of barium titanate ($BaTiO_3$) particles may be increased, and thus a temperature coefficient of capacitance (TCC) may be further stabilized, but permittivity of a sintered material may be decreased, and sinterability may be deteriorated. Therefore, in this case, the dielectric composition may be inappropriate for low-temperature sintering, such as sintering at 1100° C. or less.

Barium carbonate ($BaCO_3$), an accessory ingredient, may be contained at a content of 1.0 to 2.0 mol % and serve to suppress grain growth caused by a reaction of grains. In a case in which the content of barium carbonate ($BaCO_3$) is less than 1.0 mol %, barium carbonate ($BaCO_3$) may not properly serve to suppress grain growth, thereby causing abnormal grain growth. Conversely, in a case in which the content thereof is more than 2.0 mol %, reliability of the dielectric material may be deteriorated, and a shell fraction may be increased, whereby permittivity may be deteriorated.

Manganese oxide (MnO), an accessory ingredient, may be contained at a content of 0.1 to 1.0 mol %, and serve to increase room-temperature and high-temperature insulation resistance of the dielectric material in addition to contributing to improving reduction resistance of the dielectric material when sintering is conducted under a reducing atmosphere. In a case in which an added amount of manganese oxide (MnO) is less than 0.1 mol %, reduction resistance may be deteriorated, and insulation resistance may be decreased, and in a case in which the added amount thereof is more than 1.0 mol %, an aging rate may be further increased and capacitance may be further decreased depending on application of direct current voltage.

In addition, the borosilicate based glass, an accessory ingredient, may be contained at a content of 1.0 to 2.0 mol %. The borosilicate based glass, a sintering agent, may serve to decrease a sintering temperature of barium titanate ($BaTiO_3$) and improve sinterability. In a case of using the borosilicate based glass as the sintering agent, a lower-limit temperature of barium titanate ($BaTiO_3$) when the low-temperature sintering is conducted may be decreased, but high-temperature insulation resistance characteristics of the dielectric material after sintering is conducted may also be deteriorated. Therefore, a dielectric composition capable of being sintered at a low temperature and having improved high-temperature insulation resistance characteristics may be obtained by adjusting the content of the borosilicate based glass as a sintering agent in a range of 1.0 to 2.0 mol %. In a case in which the content of the borosilicate based glass is less than 1.0 mol %, the sintering temperature may be increased, and in a case in which the content thereof is more than 2.0 mol %, sinterability may be deteriorated, and high-temperature insulation resistance of the dielectric material may be rapidly decreased. Referring to the following [Table 2], it may be appreciated that when the content of the borosilicate based glass is 2.5 mol % or 3.0 mol %, high-temperature insulation resistance failure frequently occurs. For example, referring to the following [Table 2], in dielectric compositions of which a sintering temperature is 1100° C. or less and high-temperature insulation resistance is evaluated as "good" or "fair", the content of the borosilicate based glass is 1.0 to 2.0 mol %.

According to an exemplary embodiment, the borosilicate based glass may contain boron oxide ($B_2O_3$) and silicon dioxide ($SiO_2$) as basic ingredients, and may further contain alkali-borosilicate based glass containing an alkali metal oxide, and at least one of an alkaline earth metal oxide and an alkaline earth metal fluoride. In this case, when the sum of the number of moles of respective ingredients of the borosilicate based glass is 100, a content of boron oxide ($B_2O_3$) may be 10 to 30, a content of silicon dioxide ($SiO_2$) may be 50 to 80, a content of the alkali metal oxide is 2 to 10, a content of the alkaline earth metal oxide may be 0 to 30, and a content of the alkaline earth metal fluoride may be 1 to 5.

For example, the alkali metal oxide contained in borosilicate glass may be at least one selected from lithium oxide ($Li_2O$) and potassium oxide ($K_2O$). The alkaline earth metal fluoride may be at least one selected from calcium fluoride ($CaF_2$) and barium fluoride ($BaF_2$). The alkaline earth metal oxide may be at least one selected from calcium oxide (CaO) and barium oxide (BaO). In this case, since a calcium (Ca) compound or oxide selectively added as an ingredient of the borosilicate based glass is in a state in which a reaction is terminated when the calcium (Ca) compound or oxide constitutes the glass, the dielectric composition according to the present disclosure is different from a dielectric composition disclosed in the related prior art in which calcium (Ca) is contained as a main ingredient.

The dielectric composition may be sintered at 1200° C. or less. For example, according to an exemplary embodiment, the dielectric composition may be sintered at a low temperature of 1000° C. to 1100° C. For example, referring to the following [Table 2], the dielectric composition may be sintered at a low temperature of 1050° C. to 1100° C.

The following [Table 1] indicates ingredient ratios of low-temperature sintering dielectric compositions according to exemplary embodiments, and the following [Table 2] indicates results obtained by evaluating electrical characteristics and reliability of multilayer ceramic capacitor samples manufactured using the low-temperature sintering dielectric compositions in the Examples and Comparative Examples. Here, the multilayer ceramic capacitor samples were manufactured as follows. In [Table 2], cases in which a content of borosilicate based glass was in a range of 1.0 to 2.0 mol % based on a main ingredient with respect to the dielectric compositions having the ingredient ratios illustrated in [Table 1] correspond to the Examples, and cases in which the content of borosilicate based glass was in a range of 2.5 to 3.0 mol % based on the main ingredient with respect to the dielectric compositions having the same ingredient ratios illustrated in [Table 1] correspond to the Comparative Examples.

First, after the low-temperature sintering dielectric composition was mixed with and dispersed in an organic solvent and then mixed with an organic binder to prepare a slurry, dielectric sheets for an active layer and sheets for a cover part 13 were separately manufactured by applying the slurry on a film at a thickness of about 2 μm. After printing a nickel (Ni) internal electrode on the dielectric sheet for an active layer, and stacking 100 dielectric sheets on which the internal electrodes were printed, the dielectric sheets for a cover part were additionally stacked on upper and lower ends of the stacked dielectric sheets. Thereafter, the multilayer body was subjected to cold isostatic pressing, and then cut, thereby manufacturing a sample. The organic binder, a dispersant, and the like, were removed by heat-treating these samples at 300° C. for 4 hours or more, and then these samples were sintered at 1050° C. to 1150° C. using a sintering furnace in which a temperature and atmosphere may be controlled. In this case, oxygen partial pressure in the sintering atmosphere was controlled to $10^{-9}$-$10^{-13}$ atm. Copper (Cu) external electrodes were applied on the samples of which the sintering was completed, and further sintered at 700° C. to 900° C. After the sintering of the electrodes was completed, plating was performed thereon, thereby manufacturing the samples.

In order to examine characteristics illustrated in the following [Table 2], change in capacitance and dielectric loss of each of the samples depending on a change in AC voltage of 0.01V to 10V was measured at 1 kHz and 1V using a capacitance meter (Agilent Technologies, 4278A). Among them, capacitance and a dielectric loss when an applied voltage per unit thickness of a dielectric layer was 1V/μm were measured, and capacitance, an average thickness of dielectric layers of the sintered sample, the number of stacked dielectric layers, an electrode area, and the like, were substituted in the following Expression, thereby obtaining permittivity of the dielectric material depending on each of the sintering temperatures.

Expression: $C = \in_r \cdot \in_0 \cdot N \cdot S / t_d$

Here, C is capacitance, $\in_r$ is permittivity of the dielectric material, $\in_0$ is permittivity of a vacuum, N is the number of stacked dielectric layers, S is the area of the internal electrode, and $t_d$ is the thickness of the dielectric layer.

Reliability of the multilayer ceramic capacitor was evaluated through measurement results of high-temperature insulation resistance and moisture resistance insulation resistance in [Table 2]. When the high-temperature insulation resistance was measured, a rate voltage of 1 Vr was set as a voltage (6.3V/μm) when an applied voltage per unit thickness of the dielectric layer was 6.3V in a constant temperature state of 150° C., and insulation resistance was measured. In this case, insulation breakdown critical voltage of the sample was set as a voltage when insulation resistance of the sample was decreased to $10^5 \Omega$ or less as the applied voltage was boosted (DC voltage was increased) every 30 minutes.

TABLE 1

| Classification of Dielectric Composition | Main Ingredient BaTiO₃ | Accessory Ingredients (mol % Based on 100 mol % of Main Ingredient) | | |
|---|---|---|---|---|
| | | Rare Earth Oxide | MnO | BaCO₃ |
| A | 100 | 0.5 | 0.1 | 1.0 |
| B | 100 | 0.7 | 0.5 | 1.0 |
| C | 100 | 0.7 | 0.1 | 1.5 |
| D | 100 | 1.0 | 0.1 | 1.5 |
| E | 100 | 1.0 | 0.5 | 1.5 |
| F | 100 | 0.7 | 0.5 | 2.0 |
| G | 100 | 1.0 | 1.0 | 2.0 |

[Table 1] is a table illustrating content conditions of the main ingredient and the accessory ingredients.

TABLE 2

| Classification | Number | Classification of Dielectric Composition | Added Amount of Glass | Sintering Temperature (° C.) | Permittivity | High-Temperature Insulation Resistance | TCC (125° C.) |
|---|---|---|---|---|---|---|---|
| Example | 1 | A | 1.0 | 1080 | 2200 | ○ | −20% |
| | 2 | A | 1.5 | 1080 | 2100 | ○ | −10% |
| | 3 | B | 1.0 | 1080 | 2200 | Δ | −15% |
| | 4 | B | 1.5 | 1070 | 2300 | Δ | −13% |
| | 5 | B | 2.0 | 1070 | 2400 | Δ | −10% |
| | 6 | C | 1.0 | 1050 | 2200 | Δ | −9% |
| | 7 | C | 1.5 | 1050 | 2400 | ○ | −10% |
| | 8 | C | 2.0 | 1050 | 2500 | ○ | −9% |
| | 9 | D | 1.0 | 1060 | 2100 | ○ | −10% |
| | 10 | D | 1.5 | 1070 | 2200 | Δ | −7% |
| | 11 | D | 2.0 | 1080 | 2300 | ○ | −10% |
| | 12 | E | 1.0 | 1070 | 2400 | ○ | −11% |
| | 13 | E | 1.5 | 1080 | 2200 | Δ | −13% |
| | 14 | E | 2.0 | 1100 | 2300 | Δ | −15% |
| | 15 | F | 1.0 | 1080 | 2200 | Δ | −17% |
| | 16 | F | 1.5 | 1100 | 2300 | ○ | −19% |
| | 17 | F | 2.0 | 1100 | 2500 | ○ | −17% |
| | 18 | G | 1.5 | 1080 | 2400 | Δ | −13% |
| | 19 | G | 2.0 | 1100 | 2500 | ○ | −10% |
| Comparative Example | 20 | B | 2.5 | 1150 | 2400 | Δ | −35% |
| | 21 | B | 3.0 | 1130 | 2300 | X | −20% |
| | 22 | C | 2.5 | 1100 | 2500 | Δ | −20% |
| | 23 | C | 3.0 | 1130 | 2300 | Δ | −17% |
| | 24 | D | 2.5 | 1100 | 2700 | Δ | −15% |
| | 25 | D | 3.0 | 1130 | 2500 | X | −20% |
| | 26 | E | 2.5 | 1100 | 2300 | X | −15% |
| | 27 | E | 3.0 | 1130 | 2500 | Δ | −17% |
| | 28 | F | 2.5 | 1100 | 2700 | Δ | −15% |
| | 29 | F | 3.0 | 1150 | 2300 | Δ | −17% |
| | 30 | G | 2.5 | 1130 | 2500 | Δ | −20% |
| | 31 | G | 3.0 | 1130 | 2700 | X | −20% |

In [Table 2], the added amount of glass is defined as a mol % of glass based on 100 mol % of the main ingredient, and in high-temperature insulation resistance evaluation, "○" is defined as meaning that critical insulation resistance was evaluated as "good" (more than 7 Vr), "Δ" is defined as meaning that critical insulation resistance was evaluated as "fair" (3 to 7 Vr), and "X" is defined as meaning that critical insulation resistance was evaluated as "poor" (less than 3 Vr).

As illustrated in [Table 2], in samples in the Examples according to the present disclosure, high-temperature insulation resistance was evaluated as "good" or "fair" and the sintering temperature or TCC was also evaluated as "good". However, in cases of the Comparative Examples, cases in which high-temperature insulation resistance failure occurred were included, the sintering temperature was high, and a difference in TCC was also significantly high. The samples in the Examples according to the present disclosure were excellent in view of reliability. In particular, in the samples in Examples 2, 6 to 9, and 19, the sintering temperature was reduced, and reliability and TCC characteristics were significantly improved.

As an example, an amount of the borosilicate based glass is a half to twice as much as an amount of barium carbonate ($BaCO_3$). For example, referring to [Table 2], in dielectric compositions of which the sintering temperature was 1100° C. or less and high-temperature insulation resistance was evaluated as "good" or "fair", a content of the borosilicate based glass was 1.0 to 2.0 mol %. Among the dielectric compositions of Examples 1 to 19 corresponding thereto, dielectric compositions of which TCC at 125° C. was within −15% were dielectric compositions in Examples 2 to 14, 18, and 19. In this case, a ratio between an amount of the borosilicate based glass and an amount of barium carbonate ($BaCO_3$) in the dielectric compositions of which each TCC at 125° C. was within −15% was within a range of 0.5 to 2.0.

In this case, as another example, the content of the borosilicate based glass may be 1.0 to 2.0 mol % based on 100 mol % of barium titanate ($BaTiO_3$). For example, referring to [Table 2], in the dielectric compositions of which the sintering temperature was 1100° C. or less and high-temperature insulation resistance was evaluated as "good" or "fair", the content of the borosilicate based glass was 1.0 to 2.0 mol %.

As another example, an amount of the borosilicate based glass is a half to time and a half as much as an amount of barium carbonate ($BaCO_3$). For instance, referring to [Table 2], among dielectric compositions of which the content of the borosilicate based glass was 1.0 to 2.0 mol %, dielectric compositions of which high-temperature insulation resistance was evaluated as "good" and TCC at 125° C. was within −15% were dielectric compositions in Examples 2, 7, 8, 9, 11, 12, and 19, and the ratio between barium carbonate (BaCO$_3$) and the borosilicate based glass may be in a range of 0.5 to 1.5.

Next, a low-temperature sintering dielectric composition according to an exemplary embodiment in the present disclosure will be described with reference to FIGS. 2A through 4B. In FIGS. 2A through 4B, reference numeral 11 indicates active layers and reference numeral 13 indicates cover parts, and reference numeral 30 indicates an internal electrode.

Figure 2A:
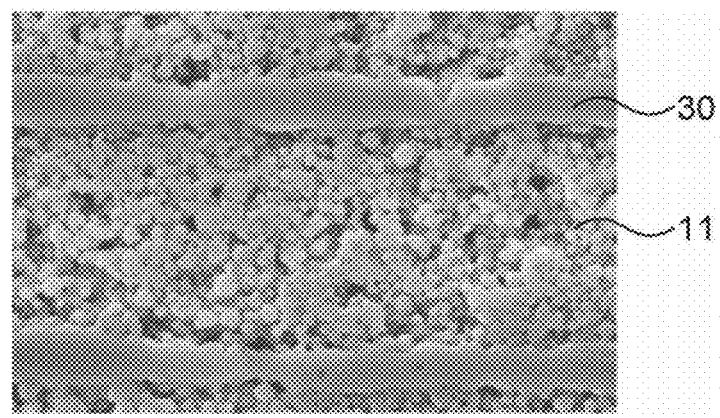
FIGS. 2A and 2B are photographs illustrating a Comparative Example compared to a low-temperature sintering dielectric composition according to an exemplary embodiment in the present disclosure.
Figure 2B:
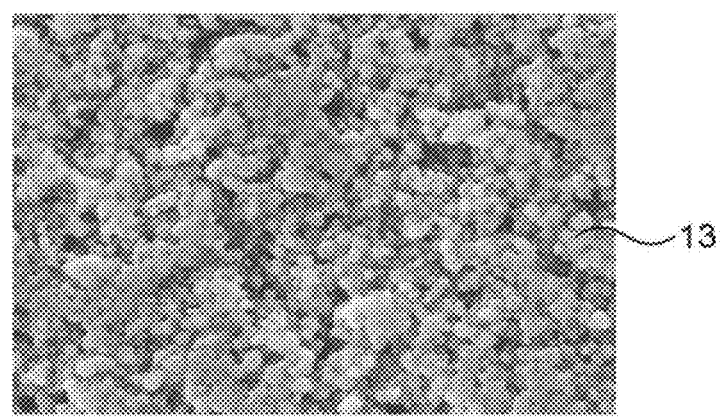

FIGS. 2A and 2B are photographs illustrating a dielectric composition of the Comparative Example compared to a low-temperature sintering dielectric composition according to the exemplary embodiment. FIG. 2A, a photograph illustrating an active layer of an existing X7R type multilayer ceramic capacitor sintered at a low temperature of 1055° C., illustrates a dielectric composition in the Comparative Example. FIG. 2B, which is a photograph illustrating a cover part of the existing X7R type multilayer ceramic capacitor sintered at a low temperature of 1055° C., illustrates a dielectric composition in the Comparative Example. The dielectric composition of the Comparative Example in FIGS. 2A and 2B contains 100 mol % of barium titanate (BaTiO$_3$) as a main ingredient, and 1.0 mol % of rare earth oxide, 1.5 mol % of barium carbonate (BaCO$_3$), and 1.0 mol % of silicon dioxide (SiO$_2$) as accessory ingredients.

Figure 3A:
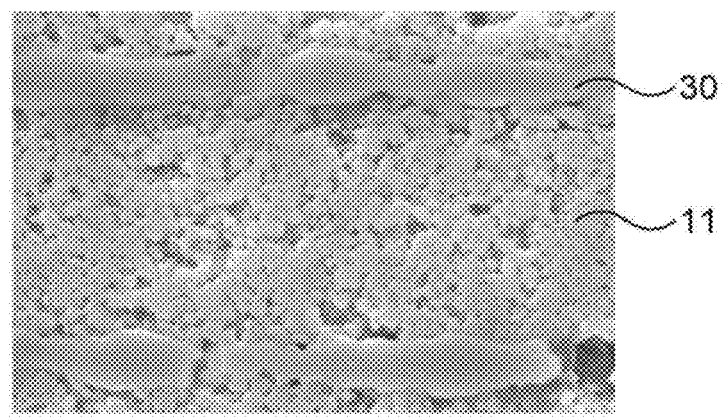
FIGS. 3A and 3B are photographs illustrating a low-temperature sintering dielectric composition according to an exemplary embodiment in the present disclosure.
Figure 3B:
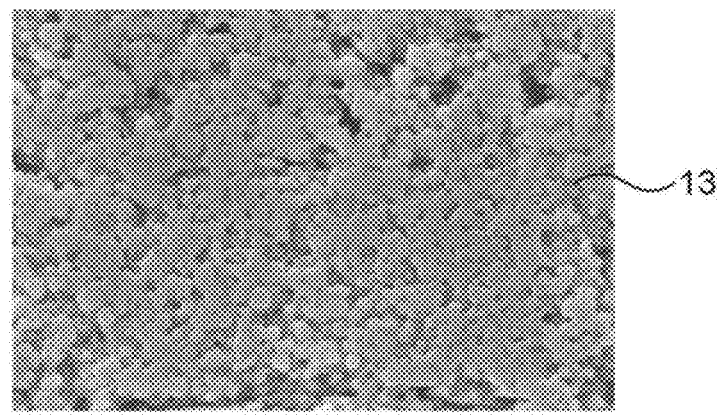

FIGS. 3A and 3B are photographs illustrating the low-temperature sintering dielectric composition according to an exemplary embodiment. FIG. 3A is a photograph illustrating an active layer of a multilayer ceramic capacitor according to an exemplary embodiment, sintered at a low temperature of 1055° C., and FIG. 3B is a photograph illustrating a cover part sintered at a low temperature of 1055° C. According to an exemplary embodiment, the dielectric composition of FIGS. 3A and 3B may contain 100 mol % of barium titanate (BaTiO$_3$) as a main ingredient and 0.5 mol % of rare earth oxide, 0.1 mol % of manganese oxide (MnO), 1.0 mol % of barium carbonate (BaCO$_3$), and 1.0 mol % of borosilicate based glass as accessory ingredients.

Figure 4A:
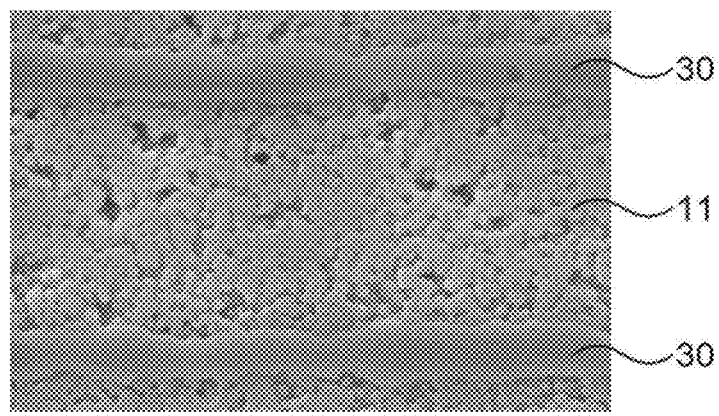
FIGS. 4A and 4B are photographs illustrating a low-temperature sintering dielectric composition according to another exemplary embodiment in the present disclosure.
Figure 4B:
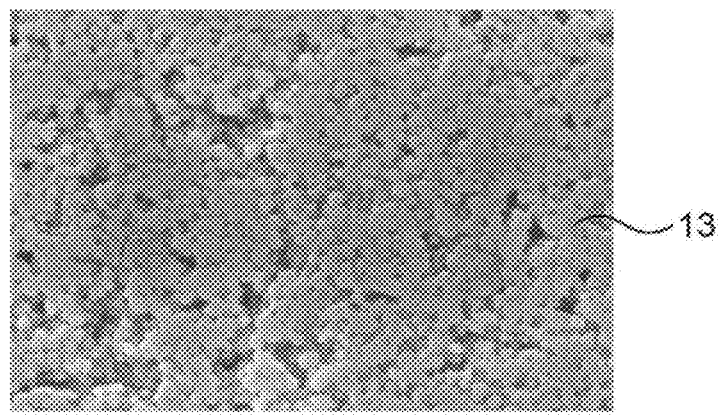

FIGS. 4A and 4B are photographs illustrating a low-temperature sintering dielectric composition according to another exemplary embodiment. FIG. 4A is a photograph illustrating an active layer of a multilayer ceramic capacitor according to another exemplary embodiment in the present disclosure, sintered at a low temperature of 1055° C., and FIG. 4B is a photograph illustrating a cover part sintered at a low temperature of 1055° C. According to another exemplary embodiment in the present disclosure, the dielectric composition of FIGS. 4A and 4B may contain 100 mol % of barium titanate (BaTiO$_3$) as a main ingredient and 0.7 mol % of rare earth oxide, 0.1 mol % of manganese oxide (MnO), 1.0 mol % of barium carbonate (BaCO$_3$), and 1.5 mol % of borosilicate based glass as accessory ingredients.

Comparing Examples 2A and 2B (Comparative Example) with FIGS. 3A and 3B and FIGS. 4A and 4B, in Comparative Example of FIGS. 2A and 2B, at the time of sintering at a low temperature of 1055° C., the active layer and the cover part did not have dense structures, but in Examples of FIGS. 3A and 3B and FIGS. 4A and 4B, at the time of sintering at a low temperature of 1055° C., the active layers and the cover parts had significantly denser structures as compared to Comparative Example of FIGS. 2A and 2B. The multilayer ceramic capacitors may have excellent moisture resistance and high-temperature insulation resistance due to the dense structures illustrated in FIGS. 3A and 3B and FIGS. 4A and 4B.

Next, a multilayer ceramic capacitor according to another exemplary embodiment will be described in detail with reference to the accompanying drawings. Here, the low-temperature sintering dielectric compositions according to the exemplary embodiment described above will be referred to, and thus, overlapping descriptions will be omitted.

FIG. 1 is a cross-sectional view schematically illustrating a multilayer ceramic capacitor according to an exemplary embodiment.

Referring to FIG. 1, the multilayer ceramic capacitor according to the exemplary embodiment may include a dielectric body 10, internal electrodes 30, and external electrodes 50. Each of the configurations will be described in detail.

The dielectric body 10 may be formed of cover parts 13 and active layers 11. The cover parts 13 may form upper and lower outer edges of a multilayer body. A plurality of active layers 11 may be formed between the cover parts 13. Here, the dielectric body may be formed of the low-temperature sintering dielectric composition according to the exemplary embodiment described above.

The dielectric composition may contain barium titanate (BaTiO$_3$) as a main ingredient and accessory ingredients. For example, according to an exemplary embodiment, barium titanate (BaTiO$_2$), the main ingredient, may have an average particle size of 100 nm to 200 nm. The accessory ingredients except for the main ingredient may include barium carbonate (BaCO$_3$), a rare earth oxide, manganese oxide (MnO), and borosilicate based glass. In this case, a content of barium carbonate (BaCO$_3$) may be 1.0 to 2.0 mol %, a content of the rare earth oxide may be 0.5 to 1.0 mol %, a content of manganese oxide (MnO) may be 0.1 to 1.0 mol %, and a content of the borosilicate based glass may be 1.0 to 2.0 mol % based on 100 mol % of the main ingredient. Further, the rare earth oxide may be at least one selected from the group consisting of Y$_2$O$_2$, Ho$_2$O$_2$, Dy$_2$O$_2$, and Yb$_2$O$_2$.

For example, according to an exemplary embodiment, the borosilicate based glass of the dielectric composition may contain boron oxide (B$_2$O$_3$) and silicon dioxide (SiO$_2$) as basic ingredients, and may further contain alkali-borosilicate based glass containing an alkali metal oxide, and at least one of an alkaline earth metal oxide and an alkaline earth metal fluoride. In this case, when the sum of the number of moles of respective ingredients of the borosilicate based glass is 100, a content of boron oxide (B$_2$O$_3$) may be 10 to 30, a content of silicon dioxide (SiO$_2$) may be 50 to 80, a content of the alkali metal oxide is 2 to 10, a content of the alkaline earth metal oxide may be 0 to 30, and a content of the alkaline earth metal fluoride may be 1 to 5.

The dielectric body may be sintered at a low temperature of 1200° C. or less. For example, according to an exemplary embodiment, the dielectric body may be sintered at a low temperature of 1000° C. to 1100° C. For example, referring to [Table 2], the dielectric composition may be sintered at a low temperature of 1050° C. to 1100° C.

Further, a thickness of the active layer 11 is not particularly limited. However, according to an exemplary embodiment, in order to implement a high capacitance capacitor having ultra reduced thickness, the thickness of a single active layer may be 1.5 μm or less, more preferably 0.5 to 1.5 μm.

Further, according to an exemplary embodiment, an average particle size of the dielectric composition forming the active layer 11 may be in a range of 150 nm to 300 nm. Since the main ingredient and the accessory ingredients are mixed together and sintered, a particle size of the dielectric composition forming the active layer 11 after sintering may become larger than a particle size of the main ingredient. In this case, the average particle size of the dielectric composition forming the cover part 13 may be larger than that of the dielectric composition forming the active layer 11. For example, according to another exemplary embodiment, an average particle size of the dielectric composition forming the cover part 13 may be in a range of 300 nm to 400 nm.

Since the low-temperature sintering dielectric composition according to the exemplary embodiment as described above is applied to the dielectric composition forming the dielectric body, the description of the low-temperature sintering dielectric composition according to the exemplary embodiment described above may be referred to for an understanding of contents that are not described in detail.

Referring to FIG. 1, the internal electrodes 30 may be composed of a plurality of electrode layers formed in the dielectric body. The plurality of electrode layers formed in the dielectric body may be formed so that each of the active layers 11 may be interposed between each of the electrode layers. In this case, the plurality of electrode layers may be alternately exposed to opposite ends of the dielectric body 10 in a direction parallel to upper and lower surfaces in the thickness direction and electrically connected to the external electrodes 50.

For example, according to an exemplary embodiment, the internal electrodes 30 may be formed of a nickel (Ni) material.

Next, the external electrodes 50 will be described. The external electrodes 50 may be formed on opposite ends of the dielectric body in a direction perpendicular to and electrically connected to the internal electrodes 30.

A method of manufacturing the multilayer ceramic capacitor according to the present exemplary embodiment is not particularly limited. For instance, a general method used in the art may be used. For example, green sheets may be formed using slurry containing a ceramic dielectric material, and internal electrodes may be printed on the green sheets and then sintered, thereby manufacturing the multilayer ceramic capacitor.

An example of the method of manufacturing a multilayer ceramic capacitor will be described. First, after the low-temperature sintering dielectric composition was mixed with and dispersed in an organic solvent and then mixed with an organic binder to prepare slurry, dielectric sheets for an active layer 11 and dielectric sheets for a cover part 13 were separately manufactured by applying the slurry on a film at a thickness of about 2 μm. Next, after printing a nickel (Ni) internal electrode on the dielectric sheet for an active layer, and stacking 100 dielectric sheets on which the internal electrode was printed, the dielectric sheets for a cover part were additionally stacked on upper and lower ends of the stacked dielectric sheets. Then, the multilayer body was cut, the organic binder, a dispersant, and the like, were removed by heat-treating the cut multilayer bodies at 300° C. for 4 hours or more, and then, these bodies were sintered at 300° C. to 1150° C. using a sintering furnace in which a temperature and atmosphere may be controlled. In this case, oxygen partial pressure in the sintering atmosphere was controlled to $10^{-9}$-$10^{-13}$ atm. Copper (Cu) external electrodes were applied on the samples of which the sintering was completed, and sintered at 700° C. to 900° C. After the sintering of the electrodes was completed, plating was performed thereon, thereby manufacturing the multilayer ceramic capacitors.

As described above, the low-temperature sintering dielectric composition satisfying the X7R temperature characteristics according to an exemplary embodiment, and the multilayer ceramic capacitor using the low-temperature sintering dielectric composition as the dielectric material, may be manufactured. In particular, according to the exemplary embodiment, high permittivity and high-temperature reliability may be secured without using a calcium (Ca) oxide. Further, according to the exemplary embodiment, nickel (Ni) internal electrodes may be used. In addition, the dielectric composition capable of being sintered at a temperature of 1200° C. or less, for example, 1100° C. or less under a reducing atmosphere and specifically having a dielectric constant of 2000 or more may be obtained.

As set forth above, according to exemplary embodiments, the low-temperature sintering dielectric composition satisfying the X7R temperature characteristics without containing calcium (Ca) in the main ingredient, and the multilayer ceramic capacitor using the low-temperature sintering dielectric composition as the dielectric material, may be manufactured.

In addition, the dielectric composition capable of being sintered at a temperature of 1200° C. or less, for example, 1100° C. or less under a reducing atmosphere may be provided, and thus high permittivity may be implemented, and high-temperature characteristics may be improved by controlling grain growth through low-temperature sintering.

Further, the dielectric composition capable of being sintered at a temperature of 1200° C. or less, for example, 1100° C. or less under a reducing atmosphere and having a dielectric constant of 2000 or more may be obtained.

While exemplary embodiments have been shown and described above, it will be apparent to those skilled in the art that modifications and variations could be made without departing from the scope of the present invention as defined by the appended claims.

What is claimed is:

1. A low-temperature sintering dielectric composition comprising:
    barium titanate ($BaTiO_3$) as a main ingredient and accessory ingredients,
    wherein the accessory ingredients include 1.0 to 2.0 mol % of barium carbonate ($BaCO_3$), 0.5 to 1.0 mol % of a rare earth oxide, 0.1 to 1.0 mol % of manganese oxide (MnO), and 1.0 to 2.0 mol % of borosilicate based glass, based on 100 mol % of the main ingredient, and
    the rare earth oxide is at least one selected from the group consisting of $Y_2O_3$, $Ho_2O_3$, $Dy_2O_3$, and $Yb_2O_3$,
    the borosilicate based glass contains boron oxide ($B_2O_3$) and silicon dioxide ($SiO_2$) as basic ingredients, and further contains an alkali metal oxide, and an alkaline earth metal fluoride, and
    when the sum of the number of moles of respective ingredients of the borosilicate based glass is 100, a content of boron oxide ($B_2O_3$) is 10 to 30, a content of silicon dioxide ($SiO_2$) is 50 to 80, a content of the alkali metal oxide is 2 to 10, and a content of the alkaline earth metal fluoride is 1 to 5.

2. The low-temperature sintering dielectric composition of claim 1, wherein a ratio of the borosilicate based glass to the barium carbonate ($BaCO_3$) is in a range of 1.0:1.5 to 1.5:1.0.

3. The low-temperature sintering dielectric composition of claim 1, wherein an average particle size of barium titanate ($BaTiO_3$) is 100 nm to 200 nm.

4. The low-temperature sintering dielectric composition of claim 1, wherein the borosilicate based glass further contains an alkaline earth metal oxide, and
when the sum of the number of moles of respective ingredients of the borosilicate based glass is 100, a content of the alkaline earth metal oxide is less than or equal to 30.

5. The low-temperature sintering dielectric composition of claim 1, wherein the dielectric composition is sintered at a low temperature of 1000° C. to 1100° C.

* * * * *